Figure 4:
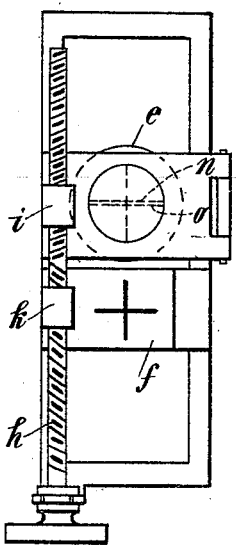

No. 849,504. PATENTED APR. 9, 1907.
F. A. SCHANZ.
SIGHT FOR GUNS.
APPLICATION FILED DEC. 22, 1905.
2 SHEETS—SHEET 1.
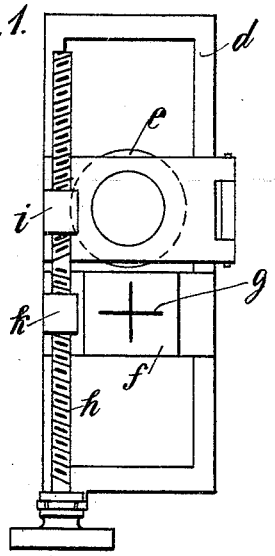
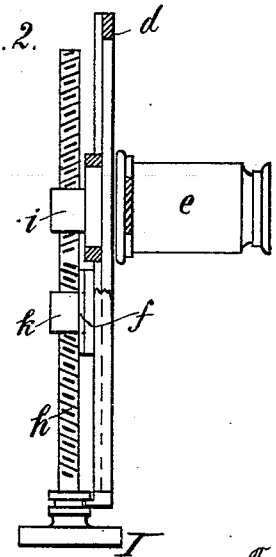
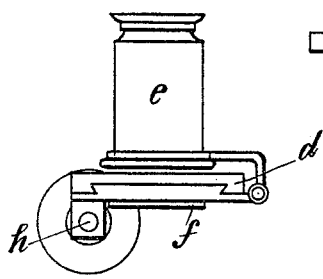
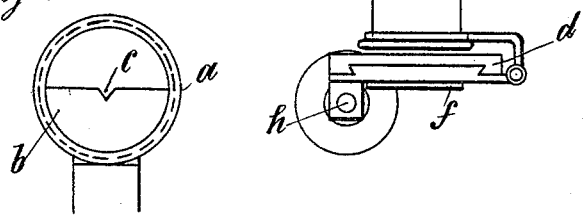
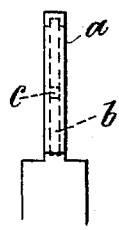
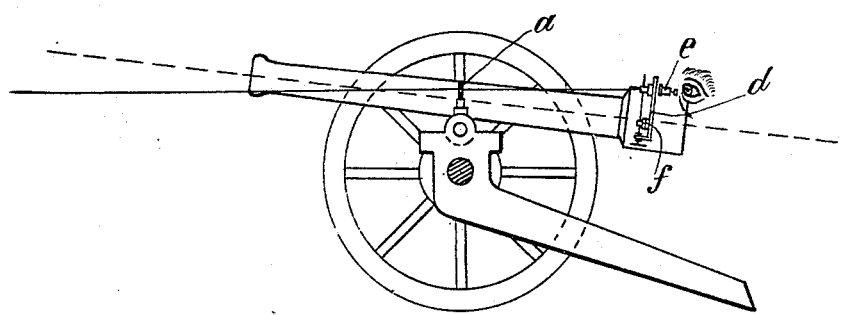
Witnesses:
Thomas Durant
Melville D. Church
Inventor:
Friedrich A. Schanz,
By Church & Church
his Attys No. 849,504. PATENTED APR. 9, 1907.
F. A. SCHANZ.
SIGHT FOR GUNS.
APPLICATION FILED DEC. 22, 1905.

2 SHEETS—SHEET 2.

Witnesses:
Thomas Durant
Melville D. Church

Inventor
Friedrich A. Schanz,
by Church & Church
his attys

THE NORRIS PETERS CO., WASHINGTON, D. C.

UNITED STATES PATENT OFFICE.

FRIEDRICH ALBIN SCHANZ, OF DRESDEN, GERMANY.

SIGHT FOR GUNS.

No. 849,504.  Specification of Letters Patent.  Patented April 9, 1907.

Application filed December 22, 1905. Serial No. 293,016.

*To all whom it may concern:*

Be it known that I, FRIEDRICH ALBIN SCHANZ, a subject of the King of Saxony, residing at Dresden, in Germany, have invented certain new and useful Improvements in or Relating to Sights for Guns, of which the following is a specification.

In the well-known telescopic sights the sighting distance is limited by the points which determine the axis of the telescope— viz., the main point of the object-glass and the point of intersection of the wires. The available sighting distance is therefore very short and supported only at one point, as both sighting-points lie in a single apparatus,— the telescope—and therefore participate in all the movements of the latter.

The object of the sighting device according to this invention is to do away with the above drawbacks by combining the well-known fore sight consisting of a mirror instead of the ordinary acorn and of a shield with a sighting-mark visible in the mirror with the sighting-telescope in such manner that the image of the sighting-mark reflected by the mirror takes the place of the cross-wires in the telescope—that is to say, the distance of the sighting-mark from the image of the mark in the mirror is utilized as the sighting distance. The telescope, which is preferably arranged so that it can be turned back or adjusted longitudinally, is arranged at the point where the eye is situated in the mirror-sight, and the laying can be effected after having been roughly set with the naked eye. The target is looked at through the telescope, and at the same time the image of the sighting-mark which is to be brought on to coincidence with the target will be seen in the telescope. When a concave mirror is used the focal length of which is equal to the distance of the sighting-mark from the mirror, the image of the sighting-mark will move away into infinity, so that it will be seen together with the target in the telescope set for the target and provided, if desired, with cross-wires. Then not only can rough setting be corrected by means of the telescope, but it will even be possible to use it for rough setting. In that case the sighting distance extends from the cross-wires in the telescope to the image of the mark and is therefore considerably larger than in well-known sighting-telescopes. By using this combination it is therefore first of all possible to increase the accuracy of sighting by the optical lengthening of the sighting distance and then also to improve it by the fact that oscillations and angular turning of the telescope no longer affect the position of the sighting-line relatively to the longitudinal axis of the gun, since that line is fixed at two points. One of these points is the notch of the mirror. The other is determined by the shield, the image of which is used for laying or aiming. If these two points alter their relative position, then the point of view also changes in accordance with a law. As in reflection the angle of incidence is equal to the angle of reflection, the point of view moves in the same upward as the mark goes downward. If for setting the sight a device is used which raises the telescope to the same extent as that to which the mark is lowered, then the telescope still retains its position relatively to the sighting-line, small oscillations of the said telescope no longer affect the position of the sighting-line relatively to the longitudinal axis of the gun, and image of the mark seen in the telescope does not participate in any oscillations of the latter.

Two constructions of the sighting device according to this invention are illustrated, by way of example, in the accompanying drawings.

Figure 8:
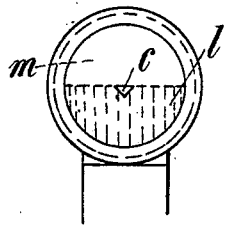
Figure 9:
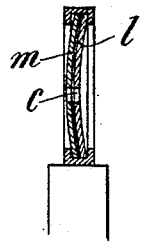
Figure 10:
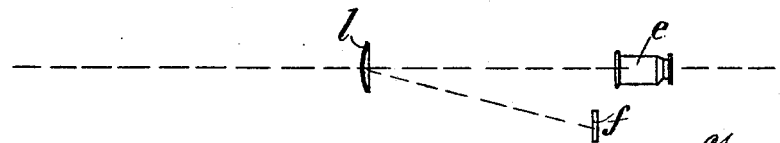

Figures 1–3 are respectively a front elevation, a side elevation partly in section, and a plan, of the device. Figs. 4 and 5 show the sight-holder with the mirror. Fig. 6 illustrates a field-piece fitted with the sighting device. Fig. 7 is a front elevation of the device, showing the telescope provided with cross-wires. Fig. 8 is a view of the sight-holder with concave mirror. Fig. 9 is a vertical sectional view of said sight-holder. Fig. 10 is a diagrammatic view of the sighting device.

The sight-holder secured to the trunnion of the gun consists of a ring $a$, the lower half of which is filled with the flat mirror $b$. The upper edge of the mirror coincides with the horizontal plane of the axis of the gun. In the center of this edge is provided a notch $c$, which enables the central portion of the target to be seen. The telescope $e$ without cross-wires, mounted on the attachment frame $d$, (which can be turned to the side in the well-known manner,) is directed toward the notch $c$, and in the same way the shield $f$ must be directed toward said notch and the mark $g$, which must be brought to coincide with the target in such manner that the point of intersection should cover the center of the target and the horizontal line of the mark—the upper edge of the mirror b.

The length of the sighting-line in accordance with the well-known optical laws will be double the distance of the attachment from the mirror. It will be readily understood that with a given angle g b e the exact position of the axis of the telescope is not of great importance, as any change of its position would merely bring the image of the mark, which continues to coincide with the target without any change, to another point of the field of vision.

According to the distance and to the elevation of the gun determined thereby the angle between the mark, mirror, and telescope must of course vary, but in such manner that this angle should be always bisected by a line parallel to the axis of the gun. For the purpose of simultaneously moving the parts e and f while maintaining the above conditions the construction illustrated, comprising a spindle h with right and left hand screw-threads mounted on an attachment-frame d and engaging nuts i and k of the parts e and f, is used.

The construction of the sighting device according to this invention (illustrated in Figs. 8–10) shows the use of a concave mirror, which, as is well known, has the property of reflecting all rays coming from the focus in parallel direction. It therefore moves the image of the mark situated at the focus away into infinity, so that it appears to lie on the target. The ease of aiming is thereby still more increased.

The mirror l is in itself circular. Its coating is, however, scraped away up to the portion hatched in Fig. 8. Behind there is arranged a glass covering for protecting the mirror-coating.

The invention does not presuppose cross-wires in the telescope; but such cross-wires could be used as the first sighting-point, Fig. 7. The aiming is then effected in such manner that the cross-wires of the telescope are made to coincide with the image of the mark, and both points set against the target. If the cross-wires are provided with two horizontal threads o o arranged close together, then there is no necessity to have a notch in the mirror. The bottom point of intersection can then be brought to coincide with the image of the mark and the upper point of intersection with the target.

What I claim as my invention, and desire to secure by Letters Patent, is—

1. In a gun or other sighting device the combination with the front mirror having a sight-opening in its upper edge through which the target may be seen, a rear shield having a sighting-mark thereon, and a telescope, said mirror, mark, and opening being so positioned, that when the reflection of the mark, the opening and the target, as seen through the telescope are brought into a single line of vision, the gun or firearm will be properly sighted; substantially as described.

2. In a gun or other sighting device the combination of a front notched mirror, a rear sighting-telescope, a rear shield bearing a sighting-mark and means for adjusting the relative positions of the telescope and shield substantially as described.

3. In a gun or other sighting device the combination of a front notched mirror, a rear sighting-telescope, a rear shield bearing a sighting-mark and means for simultaneously moving the telescope and shield toward and away from each other, substantially as described.

4. In a gun or other sighting device the combination of a front notched mirror, a rear sighting-telescope, a rear shield bearing a sighting-mark, a frame for the telescope and shield, lugs on the frame, a right and left hand screw-threaded spindle mounted on the lugs, and projections on the telescope and shield adapted to be engaged by the right and left hand threaded portions of the spindle respectively, substantially as described.

In testimony whereof I have signed my name to this specification in the presence of two subscribing witnesses.

FRIEDRICH ALBIN SCHANZ.

Witnesses:
KARL GRIMSKY,
PAUL E. SCHILLING.